(12) United States Patent
Hu et al.

(10) Patent No.: US 9,825,523 B2
(45) Date of Patent: Nov. 21, 2017

(54) CONTROL ARRANGEMENT AND METHOD FOR REGULATING THE OUTPUT CURRENT OF A DC SOURCE POWER CONVERTER CONNECTED TO A MULTI-SOURCE DC SYSTEM

(75) Inventors: Lihua Hu, Rugby (GB); Richard Ian Stephens, Rugby (GB); Martin Samuel Butcher, Rugby (GB)

(73) Assignee: GE Energy Power Conversion Technology LTD (GB)

( * ) Notice: Subject to any disclaimer, the term of this patent is extended or adjusted under 35 U.S.C. 154(b) by 749 days.

(21) Appl. No.: 14/002,369

(22) PCT Filed: Feb. 29, 2012

(86) PCT No.: PCT/EP2012/053451
§ 371 (c)(1),
(2), (4) Date: Aug. 30, 2013

(87) PCT Pub. No.: WO2012/117026
PCT Pub. Date: Sep. 7, 2012

(65) Prior Publication Data
US 2013/0334889 A1 Dec. 19, 2013

(30) Foreign Application Priority Data
Mar. 2, 2011 (EP) .................... 11001713

(51) Int. Cl.
*H02M 7/12* (2006.01)
*H02M 3/02* (2006.01)
(Continued)

(52) U.S. Cl.
CPC .............. *H02M 3/02* (2013.01); *H02M 1/32* (2013.01); *H02M 7/12* (2013.01); *H02J 3/36* (2013.01);
(Continued)

(58) Field of Classification Search
CPC ........ H02M 1/12; H02M 1/14; H02M 1/4266; H02M 1/32; H02M 1/081; H02M 1/4208;
(Continued)

(56) References Cited

U.S. PATENT DOCUMENTS 3,707,669 A * 12/1972 Kanngiesser ......... G01S 5/0009
363/51
2010/0177452 A1* 7/2010 Wei .......................... H02P 29/02
361/111

(Continued)

FOREIGN PATENT DOCUMENTS

CN 1204422 A 1/1999
DE 1588750 1/1970
(Continued)

OTHER PUBLICATIONS

European Search Report and Opinion issued in connection with corresponding EP Application No. 11001713.4 on Aug. 24, 2011.
(Continued)

*Primary Examiner* — Harry Behm
*Assistant Examiner* — Bryan R Perez
(74) *Attorney, Agent, or Firm* — Wood IP LLC

(57) ABSTRACT

A converter control arrangement (18) for regulating the output current of a dc source power converter (16) comprises a current regulator (20) for regulating the output current based on a comparison of an output current value ($I_{out}$) of the dc source power converter (16) with a desired target current value ($I_{tgt}$). When the output voltage value ($V_{out}$) of the dc source power converter (16) is within a normal operating voltage range between minimum and maximum voltage values ($V_{min}$, $V_{max}$) defined with respect to a voltage reference value ($V_{ref}$) of the dc source power converter (16), the converter control arrangement (18) controls the target current value ($I_{tgt}$) so that it is equal to a
(Continued)

desired reference current value ($I_{ref}$). When the output voltage value ($V_{out}$) is outside the normal operating voltage range, which typically indicates a fault condition, the converter control arrangement (18) modulates the reference current value ($I_{ref}$) to provide a target current value ($I_{tgt}$) that is less than the reference current value ($I_{ref}$).

19 Claims, 2 Drawing Sheets

(51) Int. Cl.
*H02M 1/32* (2007.01)
*H02J 3/36* (2006.01)
*H02J 3/38* (2006.01)

(52) U.S. Cl.
CPC .............. *H02J 3/386* (2013.01); *Y02E 10/763* (2013.01); *Y02E 60/60* (2013.01); *Y10T 307/707* (2015.04)

(58) Field of Classification Search
CPC ......... H02M 1/4233; H02M 2001/123; H02M 7/062; H02M 7/125; H02M 7/219; H02M 7/217; H02M 5/4585; H02H 7/12; H02H 7/125; H02H 7/1252; H02H 7/1255; H02H 7/1257; H02H 7/127
USPC ........ 363/44, 52, 53, 84, 114, 116, 125–127
See application file for complete search history.

(56) References Cited

U.S. PATENT DOCUMENTS

2011/0032735 A1* 2/2011 Jin .................... H02J 3/1842
  363/39
2012/0257429 A1* 10/2012 Dong .................. H02M 3/1582
  363/127

FOREIGN PATENT DOCUMENTS

| DE | 004420600 C1 * | 6/1994 |
| DE | 4420600 C1 | 11/1995 |
| EP | 2113980 | 9/2002 |
| WO | 2007033619 | 3/2007 |
| WO | 2009152840 | 12/2009 |

OTHER PUBLICATIONS

Unofficial English Translation of Chinese Office Action issued in connection with corresponding CN Application No. 201280011399.2 on Aug. 27, 2015.
PCT Search Report and Written Opinion from corresponding PCT Application No. PCT/EP2012/053451, Dated Oct. 4, 2013.
Office Action from EP Application No. 110017134-1804, dated Mar. 30, 2017, 7 pages.

* cited by examiner

CONTROL ARRANGEMENT AND METHOD FOR REGULATING THE OUTPUT CURRENT OF A DC SOURCE POWER CONVERTER CONNECTED TO A MULTI-SOURCE DC SYSTEM

TECHNICAL FIELD

The present invention relates generally to a converter control arrangement for regulating the output current of a dc source power converter connected to a multi-source dc system and/or to a method for regulating the output current of a dc source power converter connected to a multi-source dc system. Embodiments of the present invention are particularly, but not exclusively, suitable for regulating the output current of a dc source power converter connecting an ac system, such as an ac electrical power generator, to a multi-source dc system, such as a high-voltage direct current (HVDC) power transmission network to which a plurality of individual ac electrical power generators are connected in parallel. Each ac electrical power generator may be associated with a renewable-energy turbine such as a wind turbine, to enable the generated electrical power to be supplied to, and transmitted via, the HVDC power transmission network.

TECHNICAL BACKGROUND

The use of renewable energy sources to generate electricity for the power network is becoming increasingly common in many countries. It is possible to convert renewable energy such as wind, wave, tidal energy or water current flows into electrical energy by using a turbine to drive the rotor of an alternating current (ac) electrical power generator, either directly or by means of a gearbox. The ac frequency that is developed at the stator terminals of the generator is directly proportional to the speed of rotation of the rotor. The voltage at the generator terminals also varies as a function of speed and, depending on the particular type of generator, on the flux level.

In some circumstances, it can be advantageous to transmit electrical power generated by a renewable energy turbine via a high-voltage direct current (HVDC) power transmission network, as opposed to a more conventional ac power transmission network. A dc source power converter in the form of a generator bridge and operating as an active rectifier connects the ac electrical power generator of the renewable energy turbine to the HVDC power transmission network. The renewable energy turbine and its associated ac electrical power generator and dc source power converter thus operate together as an individual dc source supplying dc electrical power to the HVDC power transmission network. It will be understood that a large number of such dc sources are typically connected in parallel to the HVDC power transmission network to supply the required amount of dc electrical power to the network and ensure stable network operation.

The individual dc sources can operate under voltage control regulation to supply electrical power at a target or reference voltage value $V_{ref}$ to the HVDC power transmission network and/or under current control regulation to supply electrical power at a target or reference current value $I_{ref}$ to the HVDC power transmission network, with a combination of voltage control regulation and current control regulation being more advantageous. When a dc source power converter is used to connect an ac electrical power generator of a renewable energy turbine to a HVDC power transmission network, the use of current control regulation alone has been adopted as it is simple to implement and inherently stable.

During fault conditions, either in the HVDC power transmission network or in one or more of the parallel-connected dc sources, the output voltage at the converter terminals of one or more of the individual dc source power converters or the output current supplied by one or more of the individual dc source power converters can increase to levels that cannot be tolerated by the dc system. For example, when the dc source is operating under current control regulation, the reference voltage value $V_{ref}$ of the dc source is determined by the HVDC power transmission network and, more particularly, other devices connected to the HVDC power transmission network in parallel with the dc source. However, if the dc source becomes disconnected from the HVDC power transmission network during fault conditions, the dc source will lose its reference voltage value $V_{ref}$ but will continue to supply power at the same reference current value $I_{ref}$. This may lead to a dangerously high output voltage at the converter terminals of the dc source power converter.

There is, therefore, a need for a converter control arrangement and associated control methodology for a dc source power converter which is capable of providing reliable and effective regulation of the output current of a dc source power converter to minimise damage, either arising from excessive output voltage at the converter terminals or from excessive output current, especially during fault conditions.

SUMMARY OF THE INVENTION

According to a first aspect of the present invention, there is provided a converter control arrangement for regulating the output current of a dc source power converter, the converter control arrangement comprising:
  a current regulator for regulating the output current of the dc source power converter based on a comparison of an output current value ($I_{out}$) of the dc source power converter with a target current value ($I_{tgt}$); wherein:
  when an output voltage value ($V_{out}$) of the dc source power converter is within a normal operating voltage range defined by minimum and maximum voltage values ($V_{min}$, $V_{max}$), the converter control arrangement is operable to control the target current value ($I_{tgt}$) so that it is equal to a reference current value ($I_{ref}$); and
  when the output voltage value ($V_{out}$) is outside the normal operating voltage range, the converter control arrangement is operable to modulate the reference current value ($I_{ref}$) to provide a target current value ($I_{tgt}$) that is less than the reference current value ($I_{ref}$).

Embodiments of the present invention provide an electrical arrangement for electrical power generation comprising at least two dc sources connected in parallel to a dc system and each having a dc source power converter, at least one of the dc source power converters including a converter control arrangement according to the first aspect of the present invention. Typically, each of the dc source power converters includes a converter control arrangement according to the first aspect of the present invention.

According to a second aspect of the present invention, there is provided a method for regulating the output current of a dc source power converter, the method comprising:
  comparing an output current value ($I_{out}$) of the dc source power converter with a target current value ($I_{tgt}$) to enable regulation of the output current of the dc source power converter, wherein:

when an output voltage value ($V_{out}$) of the dc source power converter is within a normal operating voltage range defined by minimum and maximum voltage values ($V_{min}$, $V_{max}$), the target current value ($I_{tgt}$) is set to be equal to a reference current value ($I_{ref}$); and when the output voltage value ($V_{out}$) is outside the normal operating voltage range, the reference current value ($I_{ref}$) is modulated to provide a target current value ($I_{tgt}$) that is less than the reference current value ($I_{ref}$).

The converter control arrangement and method according to aspects of the present invention enable the dc source power converter to maintain the output current value ($I_{out}$) at the desired reference current value ($I_{ref}$) when the output voltage value ($V_{out}$) is within the normal operating voltage range, as defined by the predetermined minimum and maximum voltage values ($V_{min}$, $V_{max}$). The dc source power converter thus operates under current control regulation when the output voltage value ($V_{out}$) is within the normal operating voltage range.

When the output voltage value ($V_{out}$) is outside the normal operating voltage range, which is typically indicative of a malfunction or fault condition, this is detected enabling the reference current value ($I_{ref}$) to be modulated to provide a target current value ($I_{tgt}$) which is less than the reference current value ($I_{ref}$). In particular, when the output voltage value ($V_{out}$) is outside the normal operating range and greater than the maximum voltage value ($V_{max}$), the reduced target current value ($I_{tgt}$) limits the rise in the output voltage value ($V_{out}$) at the converter terminals of the dc source power converter. On the other hand, when the output voltage value ($V_{out}$) is outside the normal operating range and less than the minimum voltage value ($V_{min}$), the reduced target current value ($I_{tgt}$) limits the output current value ($I_{out}$) at the converter terminals of the dc source power converter and in particular the steady state fault current when the output voltage value ($V_{out}$) is equal to zero. In both cases, the risk of damage to the dc source power converter or/and to the whole dc system to which it is connected, which might otherwise arise as a result of excessive output voltage or excessive output current, is eliminated or at least minimised.

The dc source power converter normally connects an ac system to a dc system to enable dc electrical power to be supplied to the dc system. Thus, the dc source power converter normally operates as an active rectifier. The ac system and associated dc source power converter together form an individual dc source. The ac system typically comprises an ac electrical power generator, for example associated with a renewable energy turbine which drives a rotor of the ac electrical power generator. In such circumstances, the dc system normally comprises a HVDC electrical power network. As indicated above, a plurality of individual dc sources are normally connected in parallel to a dc system to form an electrical arrangement according to embodiments of the present invention.

The current regulator may include a current comparator for comparing the output current value ($I_{out}$) of the dc source power converter with the target current value ($I_{tgt}$) and may include a current controller for controlling the operation of the dc source power converter in order to regulate the output current value ($I_{out}$) to achieve the desired output current value ($I_{out}$), namely a value consistent with the target current value ($I_{tgt}$). The current controller typically outputs a control signal (Ctr_out) to control the operation of the dc source power converter.

The minimum and maximum voltage values ($V_{min}$, $V_{max}$) may each be defined with reference to a voltage reference value ($V_{ref}$) for the dc source power converter. The voltage reference value ($V_{ref}$) is generally the value desired for the stable operation of the dc system and the mean value of the output voltage value ($V_{out}$) of the dc source power converter when the output current value ($I_{out}$) of the dc source power converter is equal to the desired reference current value ($I_{ref}$).

The maximum voltage value ($V_{max}$) may be in the range $V_{ref} \leq V_{max} \leq 1.1 V_{ref}$. In some embodiments, the maximum voltage value could be selected as $V_{max} = 1.05 V_{ref}$.

The minimum voltage value ($V_{min}$) may be in the range $0.7 V_{ref} \leq V_{min} \leq V_{ref}$. In some embodiments, the minimum voltage value could be selected as $V_{min} = 0.75 V_{ref}$. The normal operating voltage range for the output voltage value may, therefore, be $0.7 V_{ref} \leq V_{out} \leq 1.1 V_{ref}$.

The converter control arrangement may include a gain controller which may be operable to modulate the reference current value ($I_{ref}$) when the output voltage value ($V_{out}$) exceeds the maximum voltage value ($V_{max}$), to thereby provide a target current value ($I_{tgt}$) which is less than the reference current value ($I_{ref}$). The gain controller may have a predetermined gain value which controls the level of modulation applied to the reference current value ($I_{ref}$). As the gain value of the gain controller increases, the level of modulation applied to the reference current value ($I_{ref}$) also increases to provide the reduced current target value ($I_{tgt}$). This provides fold-back of the reference current value ($I_{ref}$) during over-voltage fault conditions and thereby limits the rise in the output voltage value ($V_{out}$) at the converter terminals of the dc source power converter. The gain value is greater than 1 and is selected to provide the desired fold-back rate for the reference current value ($I_{ref}$).

The converter control arrangement may include a gain controller which may be operable to modulate the reference current value ($I_{ref}$) when the output voltage value ($V_{out}$) is less than the minimum voltage value ($V_{min}$), to thereby provide a target current value ($I_{tgt}$) which is less than the reference current value ($I_{ref}$). The gain controller may have a predetermined gain value which controls the level of modulation applied to the reference current value ($I_{ref}$). As the gain value of the gain controller increases, the level of modulation applied to the reference current value ($I_{ref}$) also increases to provide the reduced current target value ($I_{tgt}$). This provides fold-back of the reference current value ($I_{ref}$) during under-voltage fault conditions and thereby limits the output current value ($I_{out}$), which manifests itself as a fault current, at the converter terminals of the dc source power converter. The gain value is greater than 1 and is selected to provide the desired fold-back rate for the reference current value ($I_{ref}$) to minimise the fault current.

In circumstances in which the output voltage value ($V_{out}$) of the dc source power converter is equal to or greater than a predetermined maximum voltage limit value ($V_{lim\_max}$), [i.e. $V_{out} \geq V_{lim\_max}$], the converter control arrangement may be operable to modulate the reference current value ($I_{ref}$) to provide a target current value ($I_{tgt}$) that is equal to zero. This provides total fold-back of the reference current value ($I_{ref}$) during over-voltage fault conditions.

In circumstances in which the output voltage value ($V_{out}$) of the dc source power converter is equal to or possibly less than a predetermined minimum voltage limit value ($V_{lim\_min}$), the converter control arrangement may be operable to modulate the reference current value ($I_{ref}$) to provide a target current value ($I_{tgt}$) that is equal to zero. In some embodiments, the predetermined minimum voltage limit value ($V_{lim\_min}$) may be zero. This is advantageous as it enables the converter control arrangement to provide total fold-back of the reference current value ($I_{ref}$) during under-voltage fault conditions, and in particular enables the steady-state fault current to be reduced to zero.

In some embodiments, the converter control arrangement may be operable to combine, typically in a multiplier, the target current value ($I_{tgt}$) with the output voltage value ($V_{out}$) of the dc source power converter to provide a power limit value signal ($P_{lim}$). This signal can then be used to control one or more upstream devices, such as an ac electrical power generator and/or a wind turbine, to enable the or each device to limit its output power based on the power limit value signal ($P_{lim}$).

The operation of the dc source power converter is normally adjusted as part of the control method according to the second aspect of the present invention in order to enable regulation of the output current value ($I_{out}$), namely to a value consistent with the target current value ($I_{tgt}$).

In circumstances in which the output voltage value ($V_{out}$) of the dc source power converter exceeds the maximum voltage value ($V_{max}$), the control method may comprise modulating the reference current value ($I_{ref}$) in accordance with a predetermined gain value to provide a target current value ($I_{tgt}$) which is less than the reference current value NO. As explained above, this provides fold-back of the reference current value ($I_{ref}$) during over-voltage fault conditions, with the fold-back rate depending on the gain value.

In circumstances in which the output voltage value ($V_{out}$) is less than the minimum voltage value ($V_{min}$), the control method may comprise modulating the reference current value ($I_{ref}$) in accordance with a predetermined gain value to provide a target current value ($I_{tgt}$) which is less than the reference current value ($I_{ref}$). As explained above, this provides fold-back of the reference current value ($I_{ref}$) during under-voltage fault conditions, with the fold-back rate depending on the gain value.

In circumstances in which the output voltage value ($V_{out}$) is equal to or greater than a predetermined maximum voltage limit value ($V_{lim\_max}$), the control method may comprise modulating the reference current value ($I_{ref}$) to provide a target current value ($I_{tgt}$) that is equal to zero. Total foldback of the reference current value ($I_{ref}$) during over-voltage fault conditions is, thus, assured.

In circumstances in which the output voltage value ($V_{out}$) is equal to or possibly less than a predetermined minimum voltage limit value ($V_{lim\_min}$), the control method may comprise modulating the reference current value ($I_{ref}$) to provide a target current value ($I_{tgt}$) that is equal to zero. As indicated above, the predetermined minimum voltage limit value ($V_{lim\_min}$) may be zero to provide total fold-back of the reference current value ($I_{ref}$) during under-voltage fault conditions, enabling the steady-state fault current to be reduced to zero.

In some embodiments, the control method may comprise combining, and typically multiplying, the target current value ($I_{tgt}$) with the output voltage value ($V_{out}$) of the dc source power converter to provide a power limit value signal ($P_{lim}$). The control method may comprise controlling one or more upstream devices, such as an ac electrical power generator and/or a wind turbine, to enable the or each device to limit its output power based on the power limit value signal ($P_{lim}$). The control method may comprise transmitting the power limit value signal ($P_{lim}$) to the or each upstream device to provide said power limit control.

DRAWINGS

DETAILED DESCRIPTION OF EMBODIMENTS OF THE INVENTION

Embodiments of the present invention will now be described by way of example only and with reference to the accompanying drawings.

Figure 1A:
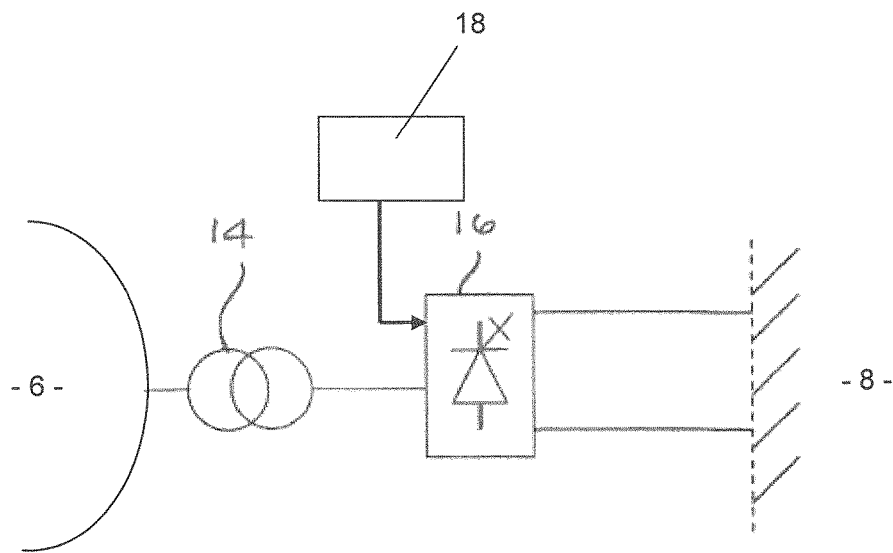
FIG. 1a is a schematic illustration of one of a plurality of dc sources connected in parallel to a dc system and including a dc source power converter.

FIG. 1a illustrates an electrical arrangement comprising an ac system 6 connected to a dc system 8. The ac system 6 is connected to the dc system 8 by a step-up voltage transformer 14 and a dc source power converter 16 operating as an active rectifier. The ac system 6, step-up voltage transformer 14 and dc source power converter 16 operate collectively as a dc source which supplies dc electrical power to the dc system.

Figure 1B:
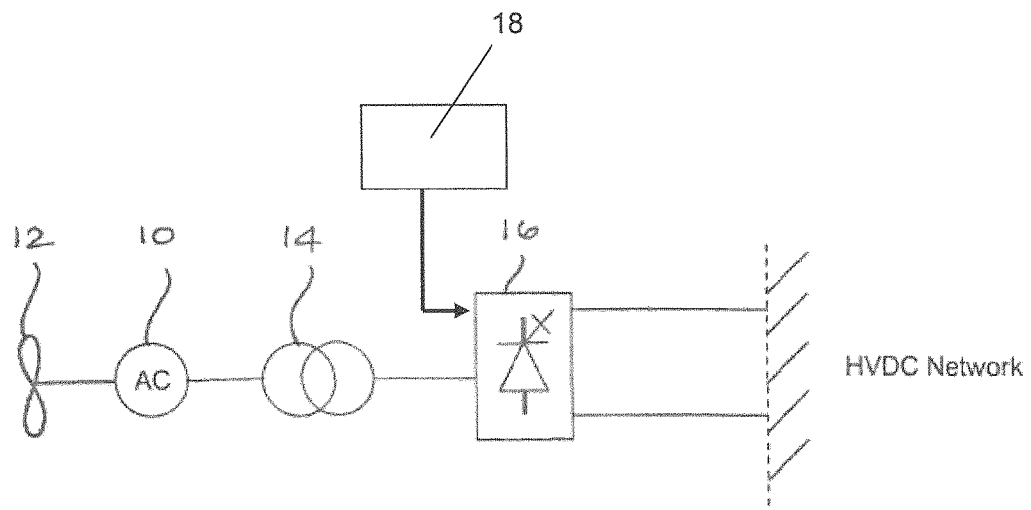
FIG. 1b is a schematic illustration of one of a plurality of ac electrical power generators connected in parallel to a HVDC power transmission network and including a dc source power converter.

Referring now to FIG. 1b, in one implementation of the electrical arrangement, the ac system comprises an alternating current (ac) electrical power generator 10 which is driven by a wind turbine 12 and the dc system comprises a high-voltage direct current (HVDC) power transmission network. In this particular electrical arrangement, the dc source thus consists of the ac electrical power generator 10 and its associated wind turbine 12, the step-up voltage transformer 14 and the dc source power converter 16 which operates as a generator bridge. It will be appreciated that a typical wind farm comprises a large number of such dc sources and these are normally connected in parallel to the HVDC network.

As discussed earlier in this specification, operational difficulties can occur during fault conditions when several dc sources are connected in parallel to a dc system. In order to reduce the potentially damaging effects that can arise as a result of such operational difficulties, embodiments of the present invention provide a converter control arrangement 18 which can be used to regulate the output current of a dc source power converter such as the dc source power converters 16 that form part of the electrical arrangements described above with reference to FIGS. 1a and 1b. When a plurality of dc sources, each comprising a dc source power converter 16, are connected in parallel, it is feasible that only one of the dc source power converters 16 may include a converter control arrangement 18 in accordance with embodiments of the present invention to regulate its output current. Typically, however, the dc source power converter 16 of each dc source includes a converter control arrangement 18 in accordance with embodiments of the present invention to regulate its output current.

Figure 2:
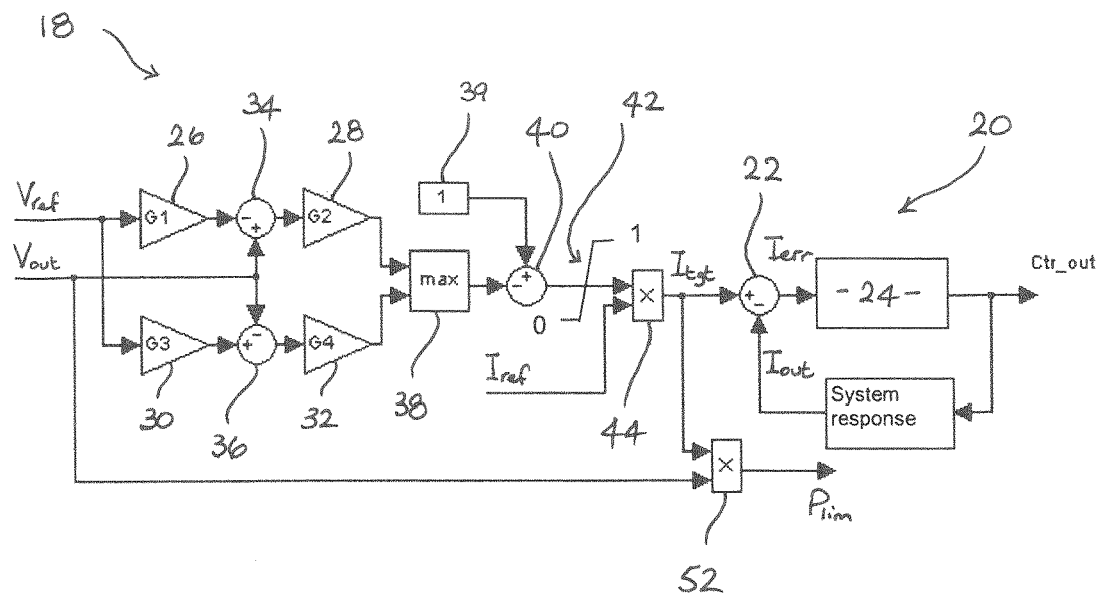
FIG. 2 is a schematic illustration of a converter control arrangement according to one embodiment of the present invention which is suitable for controlling the dc source power converter of FIGS. 1a and 1b.

A schematic illustration of a converter control arrangement 18 according to one embodiment of the present invention is illustrated in FIG. 2. The converter control arrangement 18 comprises a current regulator 20 which includes a current comparator 22 and a current controller 24. The current comparator 22 subtracts a measured output current value $I_{out}$ of the dc source power converter 16 from a desired target current value $I_{tgt}$. If there is any deviation or error between these two current values in the form of a current error value signal $I_{err}$, this current error value signal $I_{err}$ is input into the current controller 24. The current controller 24 then outputs a control signal Ctr_out to actively control the operation of the dc source power converter 16 in order to regulate the output current value $I_{out}$ so that it is consistent with the target current value $I_{tgt}$.

In accordance with the general principles of the present invention, the converter control arrangement 18 controls the target current value $I_{tgt}$ according to the operational state of the dc source power converter 16, this operational state being determined based on the measured output voltage value $V_{out}$ of the dc source power converter 16.

Figure 3:
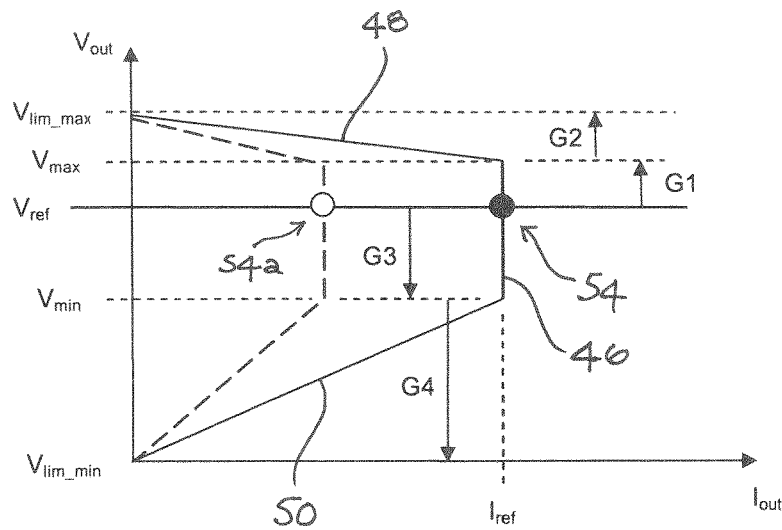
FIG. 3 is a graphic representation of voltage against electrical current for a dc source power converter controlled by the converter control arrangement of FIG. 2.

More particularly, and referring also to FIG. 3, the converter control arrangement 18 sets a normal operating voltage range which is defined, with reference to the desired reference voltage value $V_{ref}$ for normal operation of the dc source power converter 16, by a minimum voltage value $V_{min}$ and a maximum voltage value $V_{max}$. When the output voltage value $V_{out}$ of the dc source power converter 16 is within this normal operating voltage range, between the minimum voltage value $V_{min}$ and the maximum voltage value $V_{max}$, the converter control arrangement 18 detects that the power converter 16 is operating within acceptable operational limits. In these circumstances, the converter control arrangement 18 sets the target current value $I_{tgt}$ to be equal to the desired reference current value $I_{ref}$ and the dc source power converter 16 thus operates in accordance with current control regulation. This normal operational state is represented by the vertical line 46 in FIG. 3. In the particular scenario where the output voltage value $V_{out}$ is equal to the desired reference voltage value $V_{ref}$ and the current controller 24 is adequately regulating the output current value $I_{out}$ of the power converter 16 so that it is consistent with the target current value $I_{tgt}$ (and hence the reference current value $I_{ref}$), it will be appreciated that the dc source power converter 16 will operate normally, at the operating point 54 shown in FIG. 3.

However, when the output voltage value $V_{out}$ of the dc source power converter 16 is outside the normal operating voltage range, which is normally indicative of a malfunction or fault condition, this is detected by the converter control arrangement 18. In these circumstances, the converter control arrangement 18 modulates the reference current value $I_{ref}$ to provide a reduced target current value $I_{tgt}$ which is less than the reference current value $I_{ref}$. The converter control arrangement 18 is, thus, able to provide fold-back of the reference current value $I_{ref}$ during both over-voltage and under-voltage fault conditions. Fold-back of the reference current value $I_{ref}$ during over-voltage conditions, to provide the reduced current target value $I_{tgt}$, is represented by the upper fold-back line 48 in FIG. 3. Similarly, fold-back of the reference current value $I_{ref}$ during under-voltage conditions, to provide the reduced current target value $I_{tgt}$, is represented by the lower fold-back line 50 in FIG. 3.

In the embodiment illustrated in FIG. 2, the converter control arrangement 18 includes four gain controllers 26, 28, 30, 32 each having respective predetermined gain values G1, G2, G3, G4. As indicated in FIG. 3, the gain values G1 and G3 of the gain controllers 26, 30 determine respectively the maximum and minimum voltage values $V_{max}$, $V_{min}$ and thereby define the normal operating voltage range of the dc source power converter 16. The maximum voltage value $V_{max}=G1V_{ref}$ and the minimum voltage value $V_{min}=G3V_{ref}$. Thus, the normal operating voltage range for the output voltage value $V_{out}$ is defined by the relationship $G3V_{ref} \leq V_{out} \leq G1V_{ref}$.

The gain value G2 of the gain controller 28 determines the level of modulation, and hence the fold-back rate, applied to the reference current value $I_{ref}$ to thereby provide the reduced target current value $I_{tgt}$, during over-voltage fault conditions when the output voltage value $V_{out}$ of the power converter 16 is greater than the maximum voltage value $V_{max}$ at the upper end of the normal operating voltage range. Similarly, the gain value G4 of the gain controller 32 determines the level of modulation, and hence the fold-back rate, applied to the reference current value $I_{ref}$ to thereby provide the reduced target current value $I_{tgt}$, during under-voltage fault conditions when the output voltage value $V_{out}$ of the power converter 16 is less than the minimum voltage value $V_{min}$ at the lower end of the normal operating voltage range.

The illustrated embodiment of the converter control arrangement 18 includes subtraction control blocks 34, 36, a maximum output control block 38, a constant value control block 39 having a constant value of 1, a subtraction control block 40, a limiting or saturation control block 42 having a lower limit value of 0 and an upper limit value of 1, and a multiplication control block 44. This arrangement of control blocks, in conjunction with the gain controllers 26, 28, 30, 32, enables the converter control arrangement 18 to control the target current value $I_{tgt}$ so that it is equal to the reference current value $I_{ref}$ when the output voltage value $V_{out}$ of the power converter 16 is within the normal operating voltage range and to modulate the reference current value $I_{ref}$ to provide a reduced target current value $I_{tgt}$ when the output voltage value $V_{out}$ is outside the normal operating voltage range.

The operation of the converter control arrangement 18 illustrated in FIG. 2 will now be explained with reference to a specific embodiment in which the gain value G1 is 1.05 so that the maximum voltage value $V_{max}=1.05V_{ref}$ and in which the gain value G3 is 0.75 so that the minimum voltage value $V_{min}=0.75V_{ref}$. This means that the permissible maximum voltage value $V_{max}$ is 105% of (i.e. 5% greater than) the desired reference voltage value $V_{ref}$ for normal operation of the power converter 16 whilst the permissible minimum voltage value $V_{min}$ is 75% of (i.e. 25% less than) the desired reference voltage value $V_{ref}$ for normal operation of the power converter 16. Accordingly, in this specific embodiment, it will be understood that when the output voltage value $V_{out}$ of the dc source power converter 16 is in the normal operating voltage range $0.75V_{ref} \leq V_{out} \leq 1.05V_{ref}$, the reference current value $I_{ref}$ is not modulated with the result that the target current value $I_{tgt}$ is equal to the reference current value $I_{ref}$.

The gain value G2 is set to 20 as an example to provide rapid fold-back of the target current value $I_{tgt}$, during over-voltage fault conditions, by appropriate modulation of the reference current value $I_{ref}$. The magnitude of the gain value G2 determines a maximum voltage limit value $V_{lim\_max}$ (=$1.05V_{ref}+1/20V_{ref}=1.1V_{ref}$) at which the target current value $I_{tgt}$ is reduced to zero as a result of modulation of the reference current value $I_{ref}$. Thus, if the output voltage value $V_{out} \geq V_{lim\_max}$, the reference current value $I_{ref}$ is modulated to provide a target current value $I_{tgt}$ that is equal to zero. This ensures total fold-back of the reference current value $I_{ref}$ during over-voltage fault conditions in which $V_{out} \geq V_{lim\_max}$.

The gain value G4 is set to be equal to 1.33 (i.e. 4/3) for example to provide a suitable fold-back rate for the target current value $I_{tgt}$, during under-voltage fault conditions, again by appropriate modulation of the reference current value $I_{ref}$. The magnitude of the gain value G4 determines a minimum voltage limit value $V_{lim\_min}$ (=$0.75V_{ref}-1/$ 1.33$V_{ref}$=0) at which the target current value $I_{tgt}$ is reduced to zero as a result of modulation of the reference current value $I_{ref}$. In the illustrated embodiment, it will be seen that the gain value G4 is selected such that the minimum voltage limit value $V_{lim\_min}$ is equal to zero. This provides total fold-back of the reference current value $I_{ref}$. Thus, in the event that the output voltage value $V_{out}$ of the dc source power converter 16 falls to zero (i.e. $V_{lim\_min}$), the reference current value $I_{ref}$ is advantageously modulated to provide a target current value $I_{tgt}$ that is equal to zero. This ensures that the steady-state fault current is reduced to zero.

The different operational states of a dc source power converter 16 controlled by a converter control arrangement 18 having the specific gain values G1 to G4 indicated above (i.e. G1=1.05; G2=20; G3=0.75; G4=1.33) will now be described with particular reference to FIGS. 2 and 3.

Normal Operation

During the normal operational state of the dc source power converter 16, the measured output voltage $V_{out}$ is in the range 0.75$V_{ref}$≤$V_{out}$≤1.05$V_{ref}$ (i.e. G3$V_{ref}$≤$V_{out}$≤G1$V_{ref}$) with the specific gain values indicated above. This normal operational state is identified clearly by the vertical line 46 in FIG. 3.

In an example scenario in which the output voltage value $V_{out}$ of the dc source power converter 16 is equal to 0.9$V_{ref}$, the output signal from the subtraction control block 34 is negative because $V_{out}$<G1$V_{ref}$ (i.e. 0.9$V_{ref}$<1.05$V_{ref}$). Similarly, the output signal from the subtraction control block 36 is negative because $V_{out}$>G3$V_{ref}$ (i.e. 0.9$V_{ref}$>0.75$V_{ref}$). It will, therefore, be understood that the output signal from the maximum output control block 38 has a negative value irrespective of which of the two input signals has the largest magnitude. When the negative output signal is subtracted at the subtraction control block 40 from the constant value of 1 provided by the constant value control block 39, the output signal from the subtraction control block 40 is a positive value greater than 1. This output signal is then limited to a value of 1 by the limiting control block 42 so that the input signal into the multiplication control block 44 is equal to 1.

A signal value of 1, for input into the multiplication control block 44, is always derived by the converter control arrangement 18 when the output voltage value $V_{out}$ of the power converter 16 is any value in the normal operating voltage range, such that 0.75$V_{ref}$≤$V_{out}$≤1.05$V_{ref}$. This ensures that the reference current value $I_{ref}$ is not modulated, thus providing a target current value $I_{tgt}$ that is equal to the reference current value $I_{ref}$ and hence current control regulation of the power converter 16.

Over-Voltage Operation

During the over-voltage operational state of the dc source power converter 16, the measured output voltage $V_{out}$>1.05$V_{ref}$ (i.e. $V_{out}$>G1$V_{ref}$) with the specific gain values indicated above. This operational state is identified clearly by the sloping upper fold-back line 48 in FIG. 3.

In an example scenario in which the output voltage value $V_{out}$ of the dc source power converter 16 is equal to 1.08$V_{ref}$, which is less than the maximum voltage limit value $V_{lim\_max}$=1.1$V_{ref}$ (i.e. $V_{lim\_max}$=(G1+1/G2)*$V_{ref}$), the output signal from the subtraction control block 34 is positive and less than 1 because $V_{out}$>G1$V_{ref}$ (i.e. 1.08$V_{ref}$>1.05$V_{ref}$). Conversely, the output signal from the subtraction control block 36 is negative because $V_{out}$>G3$V_{ref}$ (i.e. 1.08$V_{ref}$>0.75$V_{ref}$). It will, therefore, be understood that the output signal from the maximum output control block 38 is a positive value controlled by the gain controller 28, with its gain value G2 of 20, and by the gain controller 26.

When this positive output signal, having a value between 0 and 1, is subtracted at the subtraction control block 40 from the constant value of 1 provided by the constant value control block 39, the output signal from the subtraction control block 40 is a positive value also between 0 and 1. It will be understood that this output signal is not limited by the limiting control block 42 and that it is, therefore, input directly into the multiplication control block 44 where it acts as a modulation signal for the reference current value $I_{ref}$.

A modulation signal value equal to or greater than 0 and less than 1 is always derived by the converter control arrangement 18 when the output voltage value $V_{out}$ of the power converter 16 is any value greater than 1.05$V_{ref}$. This ensures that the reference current value $I_{ref}$ is suitably modulated, thus providing a reduced target current value $I_{tgt}$ that is always less than the reference current value $I_{ref}$.

Under-Voltage Operation

During the under-voltage operational state of the dc source power converter 16, the measured output voltage $V_{out}$<0.75$V_{ref}$ (i.e. $V_{out}$<G3$V_{ref}$) with the specific gain values indicated above. This operational state is identified clearly by the sloping lower fold-back line 50 in FIG. 3.

In an example scenario in which the output voltage value $V_{out}$ of the dc source power converter 16 is equal to 0.5$V_{ref}$, which is greater than the minimum voltage limit value $V_{lim\_min}$=0 (i.e. $V_{lim\_min}$=(G3−1/G4)*$V_{ref}$), the output signal from the subtraction control block 34 is negative because $V_{out}$<G1$V_{ref}$ (i.e. 0.5$V_{ref}$<1.05$V_{ref}$). Conversely, the output signal from the subtraction control block 36 is positive and less than 1 because $V_{out}$<G3$V_{ref}$ (i.e. 0.5$V_{ref}$<0.75$V_{ref}$). It will, therefore, be understood that the output signal from the maximum output control block 38 is a positive value controlled by the gain controller 32, with its gain value G4 of 1.33, and by the gain controller 30.

When this positive output signal, having a value between 0 and 1, is subtracted at the subtraction control block 40 from the constant value of 1 provided by the constant value control block 39, the output signal from the subtraction control block 40 is a positive value also between 0 and 1. It will be understood that this output signal is not limited by the limiting control block 42 and that it is, therefore, input directly into the multiplication control block 44 where it acts as a modulation signal for the reference current value $I_{ref}$.

A modulation signal value equal to or greater than 0 and less than 1 is always derived by the converter control arrangement 18 when the output voltage value $V_{out}$ of the power converter 16 is any value less than 0.75$V_{ref}$. This ensures that the reference current value $I_{ref}$ is suitably modulated, thus providing a reduced target current value $I_{tgt}$ that is always less than the reference current value $I_{ref}$.

The converter control arrangement 18 illustrated in FIG. 2 additionally includes an optional multiplication control block 52 which receives, as its input signals, the target current value $I_{tgt}$ and the measured output voltage value $V_{out}$ of the power converter 16. These two input signals are multiplied by the multiplication control block 52 to generate a power limit value signal $P_{lim}$. This signal is transmitted to upstream devices, such as the ac electrical power generator 10 and/or the wind turbine 12 of the electrical arrangement illustrated in FIG. 1b, to limit their power generation.

Although embodiments of the invention have been described in the preceding paragraphs, it should be understood that various modifications may be made to those embodiments without departing from the scope of the following claims.

For example, gain values G1 to G4 which differ from the specific gain values indicated above could be chosen to implement the converter control arrangement 18 illustrated in FIG. 2.

A converter control arrangement 18 having a topology which differs from that illustrated in FIG. 2 could be used to implement the general principles of the present invention.

In the event that the reference current value $I_{ref}$ is modified and the gain values G1 to G4 are maintained at the same values, the control characteristics of the converter control arrangement 18 will be modified, as shown in FIG. 3, providing a modified operating point 54a.

The invention claimed is:

1. A converter control arrangement (18) for regulating the output current of a dc source power converter (16), the converter control arrangement comprising:
   a current regulator (20) for regulating the output current of the dc source power converter (16) comprising:
      a comparator (22) which compares an output current value ($I_{out}$) of the dc source power converter (16) with a target current value ($I_{tgt}$) by subtracting the output current value ($I_{out}$) measured from the target current value ($I_{tgt}$), and
      a controller (24) which outputs a control signal based on the comparison, to actively control the operation of the dc source power converter (16) to regulate the output current value ($I_{out}$) to be consistent with the target current value ($I_{tgt}$); and
   a first gain controller (28) having a predetermined first gain value (G2);
   wherein:
      when an output voltage value ($V_{out}$) of the dc source power converter (16) is within a normal operating voltage range between minimum and maximum voltage values ($V_{min}$, $V_{max}$) defined with respect to a voltage reference value ($V_{ref}$) of the dc source power converter (16), the converter control arrangement (18) operates to control the target current value ($I_{tgt}$) so that it is equal to a reference current value ($I_{ref}$); and
      when the output voltage value ($V_{out}$) is outside the normal operating voltage range, the converter control arrangement (18) operates to modulate the reference current value ($I_{ref}$) to provide a target current value ($I_{tgt}$) that is less than the reference current value ($I_{ref}$), wherein the predetermined first gain value (G2) determines the level of modulation, wherein a system response is received at the output of the controller (24) in response to the control signal and returned to the comparator (22) to continuously regulate the output current value ($I_{out}$) to be consistent with the target current value ($I_{tgt}$).

2. The converter control arrangement according to claim 1, wherein the maximum voltage value ($V_{max}$) is in the range $V_{ref} \leq V_{max} \leq 1.1 V_{ref}$ and the minimum voltage value ($V_{min}$) is in the range $0.7 V_{ref} \leq V_{min} \leq V_{ref}$.

3. The converter control arrangement according to claim 1, wherein the first gain controller (28) operates to control the level of modulation applied to the reference current value ($I_{ref}$) when the output voltage value ($V_{out}$) exceeds the maximum voltage value ($V_{max}$), to thereby provide the reduced target current value ($I_{tgt}$).

4. The converter control arrangement according to claim 1, wherein the converter control arrangement (18) includes a second gain controller (32) having a predetermined second gain value (G4), and which operates to control the level of modulation applied to the reference current value ($I_{ref}$) when the output voltage value ($V_{out}$) is less than the minimum voltage value ($V_{min}$), to thereby provide the reduced target current value ($I_{tgt}$).

5. The converter control arrangement according to claim 1, wherein when the output voltage value ($V_{out}$) is equal to or greater than a predetermined maximum voltage limit value ($V_{lim\_max}$), the converter control arrangement (18) operates to modulate the reference current value ($I_{ref}$) to provide a target current value ($I_{tgt}$) that is equal to zero.

6. The converter control arrangement according to claim 1, wherein when the output voltage value ($V_{out}$) is equal to or less than a predetermined minimum voltage limit value ($V_{lim\_min}$), the converter control arrangement (18) operates to modulate the reference current value ($I_{ref}$) to provide a target current value ($I_{tgt}$) that is equal to zero.

7. The converter control arrangement according to claim 6, wherein the predetermined minimum voltage limit value ($V_{lim\_min}$) is zero.

8. A method for regulating the output current of a dc source power converter (16), the method comprising:
   comparing an output current value ($I_{out}$) of the dc source power converter (16) with a target current value ($I_{tgt}$) by subtracting the output current value ($I_{out}$) measured from the target current value ($I_{tgt}$); and outputting a control signal, by a controller (24), to actively control the operation of the dc source power converter (16) to enable regulation of the output current of the dc source power converter (16),
   wherein:
      when an output voltage value ($V_{out}$) of the dc source power converter (16) is within a normal operating voltage range between minimum and maximum voltage values ($V_{min}$, $V_{max}$) defined with respect to a voltage reference value ($V_{ref}$) of the dc source power converter (16), the target current value ($I_{tgt}$) is equal to a reference current value NO; and when the output voltage value ($V_{out}$) is outside the normal operating voltage range, the reference current value ($I_{ref}$) is modulated to provide a target current value ($I_{tgt}$) that is less than the reference current value ($I_{ref}$),
      receiving a system response at the output of the controller (24) in response to the control signal and returned to a comparator (22) performing the comparing step, to continuously regulate the output current value ($I_{out}$) to be consistent with the target current value ($I_{tgt}$).

9. The control method according to claim 8, wherein the maximum voltage value ($V_{max}$) is in the range $V_{ref} \leq V_{max} \leq 1.1 V_{ref}$ and the minimum voltage value ($V_{min}$) is in the range $0.7 V_{ref} \leq V_{min} \leq V_{ref}$.

10. The control method according to claim 8, wherein, when the output voltage value ($V_{out}$) exceeds the maximum voltage value ($V_{max}$), the method comprises modulating the reference current value ($I_{ref}$) in accordance with a predetermined gain value (G2) to provide the target current value ($I_{tgt}$).

11. The control method according to claim 8, further comprising modulating the reference current value ($I_{ref}$) in accordance with a predetermined gain value (G4) to provide the target current value ($I_{tgt}$), when the output voltage value (Vout) is less than the minimum voltage value ($V_{min}$).

12. The control method according to claim 8, further comprising modulating the reference current value ($I_{ref}$) to provide a target current value ($I_{tgt}$) that is equal to zero, when the output voltage value (Vout) is equal to or greater than a predetermined maximum voltage limit value ($V_{lim\_max}$).

13. The control method according to claim 8, further comprising modulating the reference current value ($I_{ref}$) to provide a target current value ($I_{tgt}$) that is equal to zero, when the output voltage value (Vout) is equal to or less than a predetermined minimum voltage limit value ($V_{lim\_min}$).

14. The control method according to claim 13, wherein the predetermined minimum voltage limit value ($V_{lim\_min}$) is zero.

15. A converter control arrangement (18) comprising:
a current regulator (20) for regulating the output current of a power converter (16) based on a comparison of an output current value ($I_{out}$) of the power converter (16) with a target current value (Itgt), the current regulator comprising:
  a comparator which compares the output current value ($I_{out}$) of the dc source power converter (16) with the target current value ($I_{tgt}$) by subtracting the output current value ($I_{out}$) measured from the target current value ($I_{tgt}$),
  a controller (24) which outputs a control signal based on the comparison, to actively control the operation of the dc source power converter (16) to regulate the output current value ($I_{out}$) to be consistent with the target current value ($I_{tgt}$), and
at least one gain controller (26, 28, 30, 32) having at least one predetermined gain value (G1, G2, G3, G4),
wherein a first (G1) of the at least one predetermined gain value is to determine a maximum voltage value ($V_{max}$) to define a normal operating voltage range of the dc source power converter (16), a second (G3) of the at least one predetermined gain value is to determine a minimum voltage value ($V_{min}$) to define the normal operating voltage range of the power converter (16), wherein a system response is received at the output of the controller (24) in response to the control signal and returned to the comparator (22) to continuously regulate the output current value ($I_{out}$) to be consistent with the target current value ($I_{tgt}$).

16. The converter control arrangement (18) of claim 15, wherein the converter control arrangement (18) operates to control the target current value ($I_{tgt}$) so that it is equal to a reference current value ($I_{ref}$) when an output voltage value ($V_{out}$) of the dc source power converter (16) is within the normal operating voltage range between the maximum voltage value ($V_{max}$) and the minimum voltage value ($V_{min}$).

17. The converter control arrangement (18) of claim 15, wherein the converter control arrangement (18) operates to modulate the reference current value ($I_{ref}$) to provide a target current value ($I_{tgt}$) that is less than the reference current value ($I_{ref}$) when the output voltage value ($V_{out}$) is outside the normal operating voltage range.

18. The converter control arrangement (18) of claim 17, wherein a third (G2) of the at least one predetermined gain value is to determine a level of modulation applied to the reference current value ($I_{ref}$) during an over-voltage fault condition of the power converter (16).

19. The converter control arrangement (18) of claim 17, wherein a fourth (G4) of the at least one predetermined gain value is to determine a level of modulation applied to the reference current value ($I_{ref}$) during an under-voltage fault condition of the power converter (16).

* * * * *